United States Patent
Adireddy et al.

(10) Patent No.: US 7,428,265 B1
(45) Date of Patent: *Sep. 23, 2008

(54) SYSTEMS AND METHODS FOR OPTIMAL SYMBOL SPACING TO MINIMIZE INTERSYMBOL INTERFERENCE IN A RECEIVER (75) Inventors: Srihari Adireddy, Ithaca, NY (US); Lang Tong, Ithaca, NY (US)

(73) Assignee: Cornell Research Foundation, Ithaca, NY (US)

(*) Notice: Subject to any disclaimer, the term of this patent is extended or adjusted under 35 U.S.C. 154(b) by 1885 days.

This patent is subject to a terminal disclaimer.

(21) Appl. No.: 09/627,191

(22) Filed: Jul. 27, 2000

Related U.S. Application Data (60) Provisional application No. 60/165,322, filed on Nov. 12, 1999.

(51) Int. Cl.
*H03H 7/30* (2006.01)
(52) U.S. Cl. ..................... 375/233; 375/348; 455/63.1
(58) Field of Classification Search ............... 375/233, 375/232, 230, 229, 219, 220, 224, 259, 285, 375/295, 296, 348, 377, 316, 346; 370/310; 455/39, 63.1, 68, 91, 114.2, 114.3, 130
See application file for complete search history.

(56) References Cited

U.S. PATENT DOCUMENTS

| | | | | | |
|---|---|---|---|---|---|
| 4,599,732 | A | * | 7/1986 | LeFever | ..................... 375/346 |
| 5,602,484 | A | * | 2/1997 | Suzuki et al. | ............... 324/647 |
| 5,692,011 | A | * | 11/1997 | Nobakht et al. | .............. 375/233 |
| 5,787,133 | A | | 7/1998 | Marchetto et al. | ........... 375/366 |
| 6,167,276 | A | * | 12/2000 | Pite | ........................ 455/456.3 |
| 6,269,116 | B1 | * | 7/2001 | Javerbring et al. | .......... 375/229 |
| 6,912,250 | B1 | * | 6/2005 | Adireddy et al. | ............ 375/232 |
| 7,079,586 | B1 | * | 7/2006 | Adireddy et al. | ............ 375/285 |

FOREIGN PATENT DOCUMENTS

| | | |
|---|---|---|
| EP | 0792050 A2 | 8/1997 |
| EP | 0810742 A2 | 12/1997 |
| EP | 0981207 A1 | 2/2000 |
| WO | 9963677 A1 | 12/1999 |

* cited by examiner

*Primary Examiner*—Temesghen Ghebretinsae (57) ABSTRACT

A network includes a transmitter for transmitting a stream of known symbols and unknown symbols in an optimal distribution through a transmission channel to a receiver that receives the transmitted stream of known symbols and unknown symbols distorted by intersymbol interference (ISI). The receiver uses a known symbol generator and a precursor cancellation decision feedback equalizer (PC-DFE) to cancel precursor ISI from symbols that have not yet been decided. The transmitter comprises a known symbol distribution controller for inserting a plurality of known symbols into an outgoing stream of unknown symbols in an optimum distribution in order to improve the performance of the PC-DFE in the receiver.

20 Claims, 7 Drawing Sheets

SYSTEMS AND METHODS FOR OPTIMAL SYMBOL SPACING TO MINIMIZE INTERSYMBOL INTERFERENCE IN A RECEIVER

CROSS-REFERENCE TO RELATED APPLICATIONS

This application claims priority under 35 U.S.C. §119(e) to U.S. Provisional Patent Application No. 60/165,322 entitled "Optimal Symbol Distribution for Intersymbol Interference Channels" filed Nov. 12, 1999.

The present invention is related to those disclosed in the following United States patent applications:

1. Ser. No. 09/627,237, filed concurrently herewith, entitled "SYSTEMS AND METHODS FOR PRECURSOR CANCELLATION OF INTERSYMBOL INTERFERENCE IN A RECEIVER" and issued as U.S. Pat. No. 6,912,250;

2. Ser. No. 09/627,453, filed concurrently herewith, entitled "DUAL EQUALIZER FOR USE IN A RECEIVER AND METHOD OF OPERATION" and issued as U.S. Pat. No. 6,754,294; and 3. Ser. No. 09/627,190, filed concurrently herewith, entitled "SYSTEMS AND METHODS FOR OPTIMAL DISTRIBUTION OF SYMBOLS IN A FIXED SIZE DATA PACKET TO IMPROVE RECEIVER PERFORMANCE" and issued as U.S. Pat. No. 7,079,586.

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to wireless and wireline receivers and, more specifically, to a system and method for transmitting known symbols in a data stream in order to optimize the performance of a receiver capable of cancelling precursor intersymbol interference (ISI).

BACKGROUND OF THE INVENTION

The rapid advance of digital technology has created a great demand for, and corresponding advances in, wireless and wireline technology for communicating voice and data traffic. Much of this traffic is carried by the public switched telephone network over fiber optic cable and copper wire. Computers and other data equipment communicate over the Internet and a variety of proprietary local area networks (LANs) and wide area networks (WANs). Increasingly, various types of digital subscriber line (DSL) service or cable modem service are bringing broadband data into homes and offices. Many third generation cellular telephones and wireless PDA devices are also equipped to handle broadband data traffic and Internet capable.

However, even the most modern of wireless and wireline data communication equipment still must contend with the age-old problems inherent in transmitting data through a channel from a transmitter to a receiver. Data is often transmitted as a series of pulses (or symbols) through a wire or the atmosphere. The data symbols may become distorted due to intersymbol interference (ISI), which is an overlap of adjacently transmitted symbols. In a wireless network, ISI may be caused by reflections of the transmitted symbols off natural objects (e.g., tress, hills) and man-made objects (e.g., buildings, brides) in the environment. The reflections cause multiple time-delayed, partially overlapping copies (echoes) of the same signal to arrive at the receiver. ISI also may occur in a non-linear, bandwidth limited channel if the symbol transmission rate is comparable to or exceeds the channel bandwidth, W.

Receivers frequently use a well-known technique, adaptive decision-feedback equalization, to minimize the effects of ISI. An adaptive decision-feedback equalizer (DFE) consists of a feedforward (or forward) filter, a feedback filter, and a decision circuit that decides or detects the value of each symbol in the received signal. The input to the forward filter is the received distorted sequence of data symbols. The input to the feedback filter is the sequence of previously decided (detected) symbols at the output of the decision circuit. The feedback filter removes from the symbol presently being estimated that portion of the ISI that is caused by previously detected symbols.

There are limitations, however, to the performance of decision feedback equalizers. Even under the best of circumstances, a DFE occasionally makes an incorrect decision regarding the value of a received data symbol. The incorrect estimate is then propagated back to the feedback filter, thereby affecting decisions regarding subsequent symbols. Furthermore, a DFE almost always does not perform detection on the first copy of a symbol as it is received. Because of the performance of the channel, symbol reflections may combine in such a way that the peak power of the transmitted symbol occurs after the first echo of the symbol enters the DFE. Thus, some reflections of a symbol (postcursors) are received by the DFE after a symbol is detected, but other reflections of a symbol (precursors) are received by the DFE before the symbol is due to be detected. A conventional DFE is unable to compensate for precursor ISI in the detection of the present symbol because of the causal nature of the feedback filter.

For example, in a sequence of ten symbols, the DFE may be working on detecting (deciding) the fifth symbol. However, precursor ISI from the sixth and seventh symbols and postcursor ISI of the third and fourth symbols may contribute to distortion of the fifth symbol. Since the third and fourth symbols have already been decided by the decision circuit, the feedback loop can be used to remove the postcursor ISI. However, since the sixth symbol has not been detected yet, the feedback filter does nothing to remove the precursor ISI.

There is therefore a need in the art for improved receivers and transmitters for use in communication networks. In particular, there is a need in the art for improved decision feedback equalizers that have a lower detected symbol error rate. More particularly, there is a need for receivers containing decision feedback equalizers (DFEs) that are capable of at least partially minimizing precursor ISI due to symbols that have not yet been detected. Moreover, there is a need for improved transmitters and data networks that are capable of maximizing the performance of receivers that contain decision feedback equalizers capable of reducing precursor ISI.

SUMMARY OF THE INVENTION

To address the above-discussed deficiencies of the prior art, it is a primary object of the present invention to provide a transmitter for transmitting a stream of known symbols and unknown symbols in an optimal distribution through a transmission channel to a first receiver that receives the transmitted stream of known symbols and unknown symbols distorted by intersymbol interference (ISI). The first receiver, which is capable of reducing a precursor ISI signal, comprises 1) a decision feedback equalizer for receiving the stream of distorted known symbols and distorted unknown symbols and generating a sequence of detected symbols and 2) a known symbol generator for generating a copy of a first known symbol prior to an estimation of the first known symbol by the decision feedback equalizer, the decision feedback equalizer using the copy of the first known symbol to reduce a first precursor ISI signal in a second symbol transmitted prior to the first known symbol. According to an advantageous embodiment of the present invention, the transmitter comprises a known symbol distribution controller capable of inserting a plurality of known symbols into an outgoing stream of unknown symbols in an optimum distribution in order to improve the performance of the first receiver.

According to one embodiment of the present invention, the known symbol distribution controller is capable of determining a decision delay, d, associated with the decision feedback equalizer.

According to another embodiment of the present invention, the known symbol distribution controller determines the optimum distribution according to a value of d.

According to still another embodiment of the present invention, the known symbol distribution controller separates each inserted known symbol from a nearest inserted known symbol by a distance at least equal to d.

According to yet another embodiment of the present invention, the transmitted stream of known symbols and unknown symbols is received by a plurality of receivers similar to the first receiver and the known symbol distribution controller is capable of determining a plurality of decision delays, wherein each decision delay, d, of the plurality of decision delays is associated with a corresponding decision feedback equalizer in one of the plurality of receivers.

According to a further embodiment of the present invention, the known symbol distribution controller is capable of determining a maximum one of the plurality of decision delays.

According to a still further embodiment of the present invention, the known symbol distribution controller determines the optimum distribution according to a value of the maximum decision delay.

According to a yet further embodiment of the present invention, the known symbol distribution controller separates each inserted known symbol from a nearest inserted known symbol by a distance at least equal to the maximum decision delay.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged transmitter and communication network.

Many wireline and wireless communication systems transmit a known sequence of symbols, called a training sequence, along with the unknown sequence of user data symbols in order to synchronize and adjust the receiver. The timing and values of the symbols in the training sequence are known by the receiver, thereby making the training sequence relatively easy to detect. A channel estimator in the receiver analyzes the received training sequence, compares it to the known sequence, and uses the statistical properties of the received signal to adjust the values of the weighting coefficients in the forward filter and feedback filter of the DFE.

When the unknown symbols are received, the DFE is better able to detect the correct values of the user data symbols. The present invention takes advantage of the transmission of known symbols to provide an improved receiver that at least partially reduces precursor ISI. Furthermore, the present invention also provides an improved transmitter that transmits the known symbols in an optimum manner to take advantage of the ability of the receiver to reduce the precursor ISI.

Figure 1A:
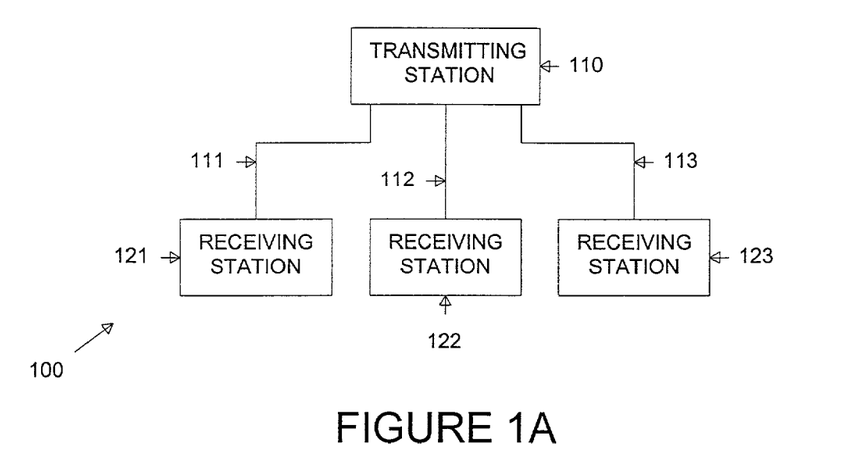
FIG. 1A illustrates an exemplary wireline network according to one embodiment of the present invention.

FIG. 1A illustrates exemplary wireline network 100 according to one embodiment of the present invention. Wireline network 100 comprises transmitting station 110 and receiving stations 121, 122 and 123. Transmitting station 110 communicates with receiving station 121-123 via wirelines 111, 112 and 113. The words "transmitting" and "receiving" with respect to transmitting station 110 and receiving stations 121-123 are exemplary only and should not be construed to limit the scope of the invention to one-way communication. In fact, in advantageous embodiments of the present invention, transmitting station 110 may comprise transceiver circuitry capable of transmitting data to, and receiving data from, receiving stations 121-123. Accordingly, in such embodiments, receiving station 121-123 also may comprise transceiver circuitry capable of transmitting data to, and receiving data from, transmitting station 110. Both transmitting station 110 and each of receiving stations 121-123 transmit data to a receiving device as mixture of known symbol sequences (e.g., training sequences) and unknown symbols (i.e., user data).

By way of example, in one embodiment of the present invention, transmitting station 110 may comprise a server in a local area network (LAN) or wide area network (WAN) that communicates bidirectionally with client nodes (i.e., receiving stations 121-123). In an alternate embodiment of the present invention, transmitting station 110 may comprise a cable television broadcast system that primarily transmit video signals to cable set-top boxes (i.e., receiving stations 121-123) in subscriber homes. However, transmitting station 110 may also receive upstream data traffic transmitted by the cable set-top boxes (STBs).

Figure 1B:
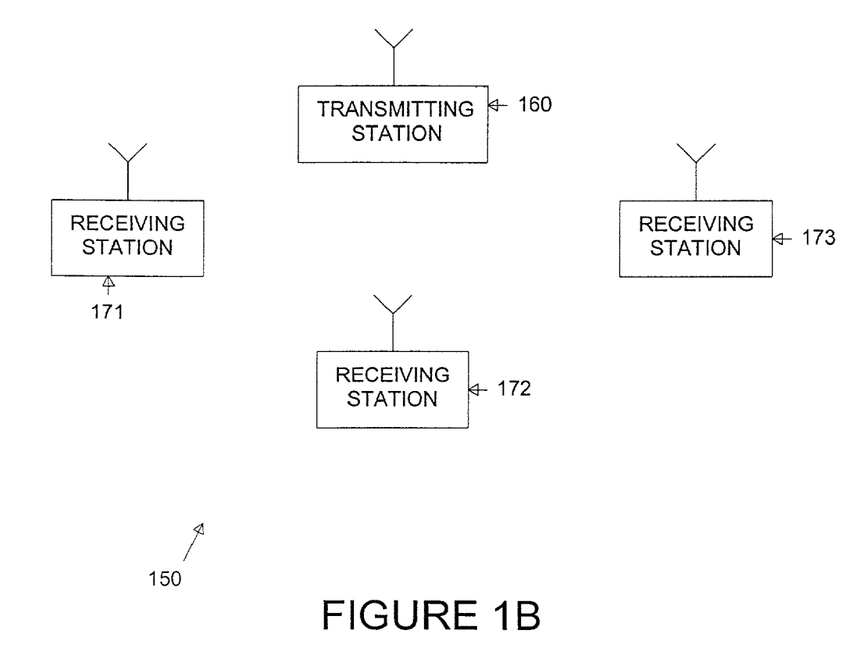
FIG. 1B illustrates an exemplary wireless network according to one embodiment of the present invention.

FIG. 1B illustrates exemplary wireless network 150 according to one embodiment of the present invention. Wireless network 150 comprises transmitting station 160 and receiving stations 171, 172 and 173. Transmitting station 160 communicates via the air interface with receiving station 171-173. Again, the words "transmitting" and "receiving" with respect to transmitting station 160 and receiving stations 171-173 are exemplary only and should not be construed to limit the scope of the invention to one-way wireless communication. In fact, in advantageous embodiments of the present invention, transmitting station 160 may comprise transceiver circuitry capable of wirelessly transmitting data to, and wirelessly receiving data from, receiving stations 171-173. Accordingly, in such embodiments, receiving station 171-173 also may comprise transceiver circuitry capable of wirelessly transmitting data to, and wirelessly receiving data from, transmitting station 160. Both transmitting station 160 and each of receiving stations 171-173 transmit data to a receiving device as mixture of known symbol sequences (e.g., training sequences) and unknown symbols (i.e., user data).

By way of example, in one embodiment of the present invention, transmitting station 160 may comprise a server in a wireless LAN or WAN that communicates bidirectionally with client nodes (i.e., receiving stations 171-173). In an alternate embodiment of the present invention, transmitting station 160 may comprise a base transceiver station in a cellular network that transmits voice and data traffic to mobile stations (i.e., receiving stations 171-173) and receive voice and data traffic from the mobile stations (e.g., cell phones). In still another embodiment of the present invention, transmitting station 160 may comprise a high definition television (HDTV) broadcast facility that transmits high definition video signals to HDTV receivers (i.e., receiving stations 171-173) in its local coverage area.

In both wireline network 100 and wireless network 150, each transmitted data symbol arrives at the receiving device distorted by postcursor and precursor intersymbol interference (ISI) caused by the band-width limited transmission channel and or reflections off objects. To minimize the effects of ISI, receiving stations 121-123 and receiving stations 171-173 comprise adaptive decision feedback equalizers (DFEs) capable of reducing both postcursor ISI and precursor ISI in accordance with the principles of the present invention. Furthermore, in bidirectional communication networks, transmitting stations 110 and 160 also may comprise adaptive DFEs capable of reducing both postcursor ISI and precursor ISI in signals transmitted by receiving stations 121-123 and receiving stations 171-173.

Figure 2:
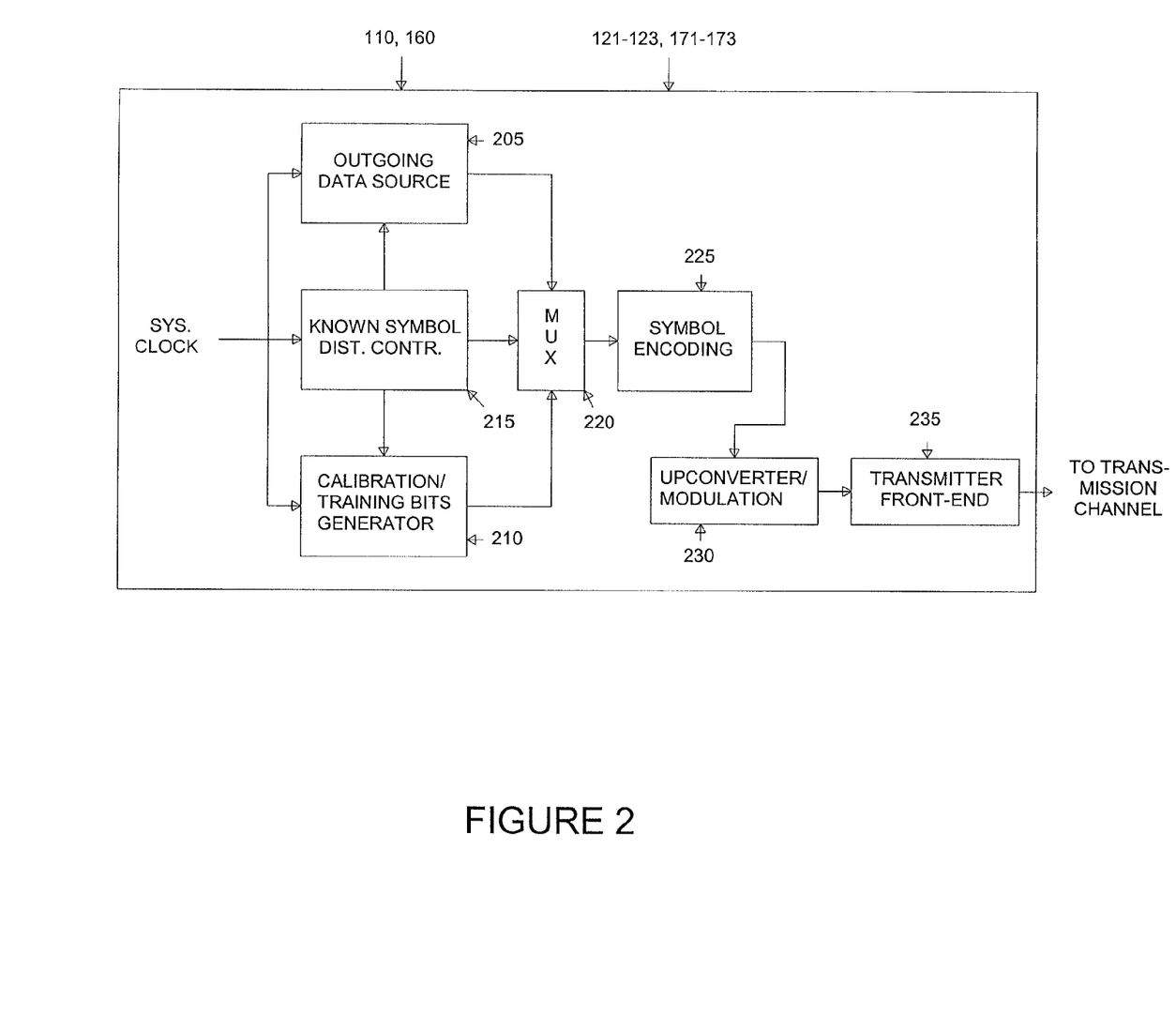
FIG. 2 illustrates selected portions of exemplary transmitter circuitry disposed in the transmitting stations and, for two-way systems, the receiving stations in FIGS. 1A and 1B.

FIG. 2 illustrates selected portions of exemplary transmitter circuitry disposed in transmitting stations 110 and 160 and, for two-way systems, receiving stations 121-123 and 171-173. The exemplary transmitter circuitry comprises outgoing data source 205, calibration/training bits generator 210, known symbol distribution controller 215, multiplexer 220, symbol encoding circuitry 225, up-converter/modulation circuitry 230, and transmitter front-end circuitry 235. Outgoing data source 205 generates the user data that is to be transmitted to a receiving device. For example, outgoing data source 205 may be a cell phone vocoder that converts an analog voice signal to digital data to be transmitted to a base transceiver station. Alternatively, outgoing data source 205 may be an application executed on a server that transmits data to a client work station via a wireline LAN.

The user data generated by outgoing data source 205 are unknown data bits that are combined with known data bits generated by calibration/training bits generator 210. Calibration/training bits generator 210 may generated a training sequence that precedes the unknown user data. Calibration/training bits generator 210 also may generate additional training sequences that are distributed among the unknown data as a single block or in a plurality of smaller blocks at known intervals or locations among the unknown user data. For example, in a GSM mobile phone network, a GSM data packet comprises 148 bits, including 116 user data bits. The GSM data packet also comprises 3 start bits at the start of the user data, a 26-bit training sequence in the middle of the user data bits, and 3 stop bits at the end of the user data bits.

The size and location of the training/calibration sequences of known data bits are controlled by known symbol distribution controller 215, which selectively switches the source of data that is output by multiplexer (MUX) 220. Thus, the output of MUX 220 is a stream of known calibration/training bits interspersed at known locations among unknown user data bits. In an advantageous embodiment of the present invention, known symbol distribution controller 215 is an adaptive device that is capable of modifying the size and location of groups of calibration/training bits according to the known characteristics of the receiver. More particularly, known symbol distribution controller 215 is capable of modifying the size and location of groups of calibration/training bits in order to maximize the performance of the improved precursor ISI cancellation decision feedback equalizer (DFE) in the receiving device.

Symbol encoding circuitry 225 encodes the data bits according to any known symbol encoding scheme. Thus, a Logic 1 bit received from multiplexer 225 may be encoded as a first unique sequence of pulses and a Logic 0 bit received from multiplexer 225 may be encoded as a second unique sequence of pulses. Thus, the output of symbol encoding circuitry 225 is the sequence of known and unknown symbols that must be detected by the receiver DFE.

Up-converter/modulation circuitry 230 converts the baseband sequence of known and unknown symbols to a modulated (up-converted) signal capable of being transmitted through the transmission channel (wireline or wireless). For example, in a wireless network, up-converter/modulation circuitry 230 may comprise an RF mixer that converts the baseband sequence to a modulated radio frequency (RF) signal capable of being transmitted through the air channel to a receiving device. Finally, transmitter front-end circuitry comprises RF amplifiers, duplexer circuitry, and antennas that transmit the output of up-converter/modulation circuitry 230 into the corresponding wireline or wireless channel.

The arrangement and interconnection of known symbol distribution controller 215, calibration/training bits generator 210, and symbol encoding circuitry 225 is exemplary only. Those skilled in the art will recognize there are numerous other circuit arrangements capable of inserting known symbols at known locations in a sequence of outgoing unknown symbols. The arrangement in FIG. 2 is suitable for those applications in which a symbol is used to represent no more than one data bit. This ensures that a known bit from calibration/training bits generator 210 is encoded only as a known symbol and that an unknown bit from outgoing data source 205 is encoded only as an unknown symbol.

However, in other systems, a single symbol may be used to represent more than one data bit. For example, four different symbols may be used to represent the bit pairs 00, 01, 10, 11. In such a system, precautions must be taken to ensure that symbol encoding circuitry 225 does not encode a known bit and an unknown data bit as a single symbol. To accomplish this, known symbol distribution controller 215 and calibration/training bits generator 210 may be coupled directly to symbol encoding circuitry 225, and multiplexer 220 may be omitted. In such a circuit arrangement, symbol encoding circuitry 225 would encode all unknown data bit pairs from outgoing data source 205 as a sequence of unknown symbols and known symbol distribution controller 215 would cause symbol encoding circuitry 225 to insert known symbols representing known data bit pairs into the outgoing sequence of unknown symbols.

Figure 3:
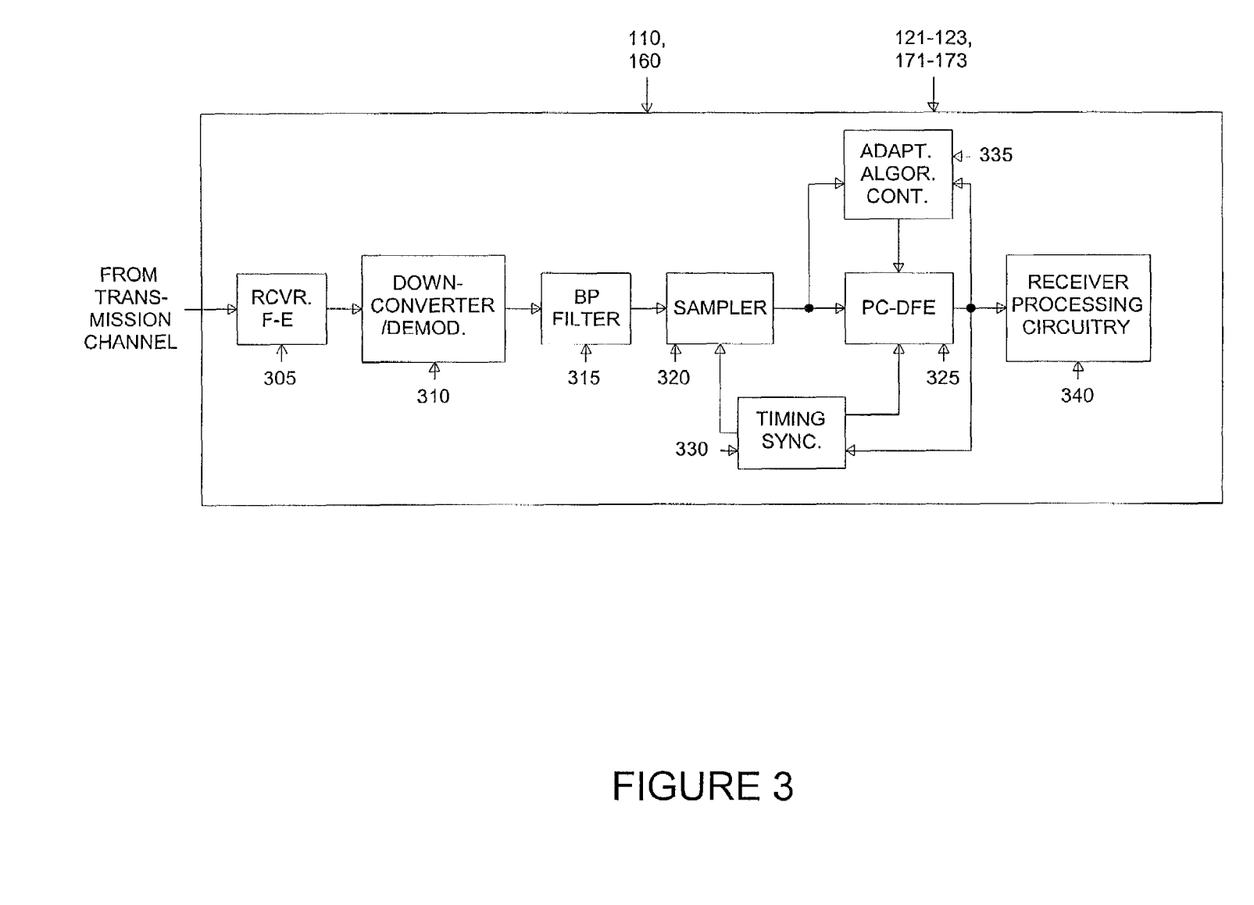
FIG. 3 illustrates selected portions of exemplary receiver circuitry disposed in the receiving stations and, for two-way systems, the transmitting stations in FIGS. 1A and 1B.

FIG. 3 illustrates selected portions of exemplary receiver circuitry disposed in receiving stations 121-123 and 171-173 and, for two-way systems, transmitting stations 110 and 160. The exemplary receiver circuitry comprises receiver front-end (F-E) circuitry 305, down-converter/demodulation circuitry 310, bandpass (BP) filter 315, sampler circuitry 320, precursor decision feedback equalizer (PC-DFE) 325, timing synchronization circuitry 330, adaptive algorithm controller 335, and receiver processing circuitry 340. Receiver front-end circuitry 305 typically comprises a low noise amplifier and filters that receive the transmitted known and unknown symbols from the wireline or wireless channels and amplify and isolate the frequencies of interest (i.e., receive band).

Down-converter/demodulation circuitry 310 demodulates (down-converts) the incoming modulated signals to produce an analog baseband signal comprising a sequence of known and unknown symbols that are distorted to postcursor and precursor ISI. Sampler circuitry 320 converts the analog baseband signal to a digital baseband signal. The digital baseband signal is filtered by PC-DFE 325 to minimize the postcursor and precursor ISI distortion. Ideally, the output of PC-DFE 325 is the original sequence of known and unknown symbols.

Timing synchronization circuit 330 receives the output of PC-DFE 325 and uses it to synchronize (align) the analog-to-digital converter in sampler circuitry 320 and to synchronize the filtering circuitry in PC-DFE 325, as described below in greater detail. Adaptive algorithm controller 335 also receives the output of PC-DFE 325 and compares it to the input sequence of distorted symbols from sampler circuitry 320. From this comparison, adaptive algorithm controller 335 can determine and modify the weighting coefficients in the forward filter section and the feedback filter section of PC-DFE 325 in order to minimize ISI distortion. Finally, receiver processing circuitry 340 converts the sequence of known (i.e., calibrations/training) symbols and unknown symbols back to data bits and extracts the user data bits according to the algorithm used by known symbol distribution controller 215.

Figure 4:
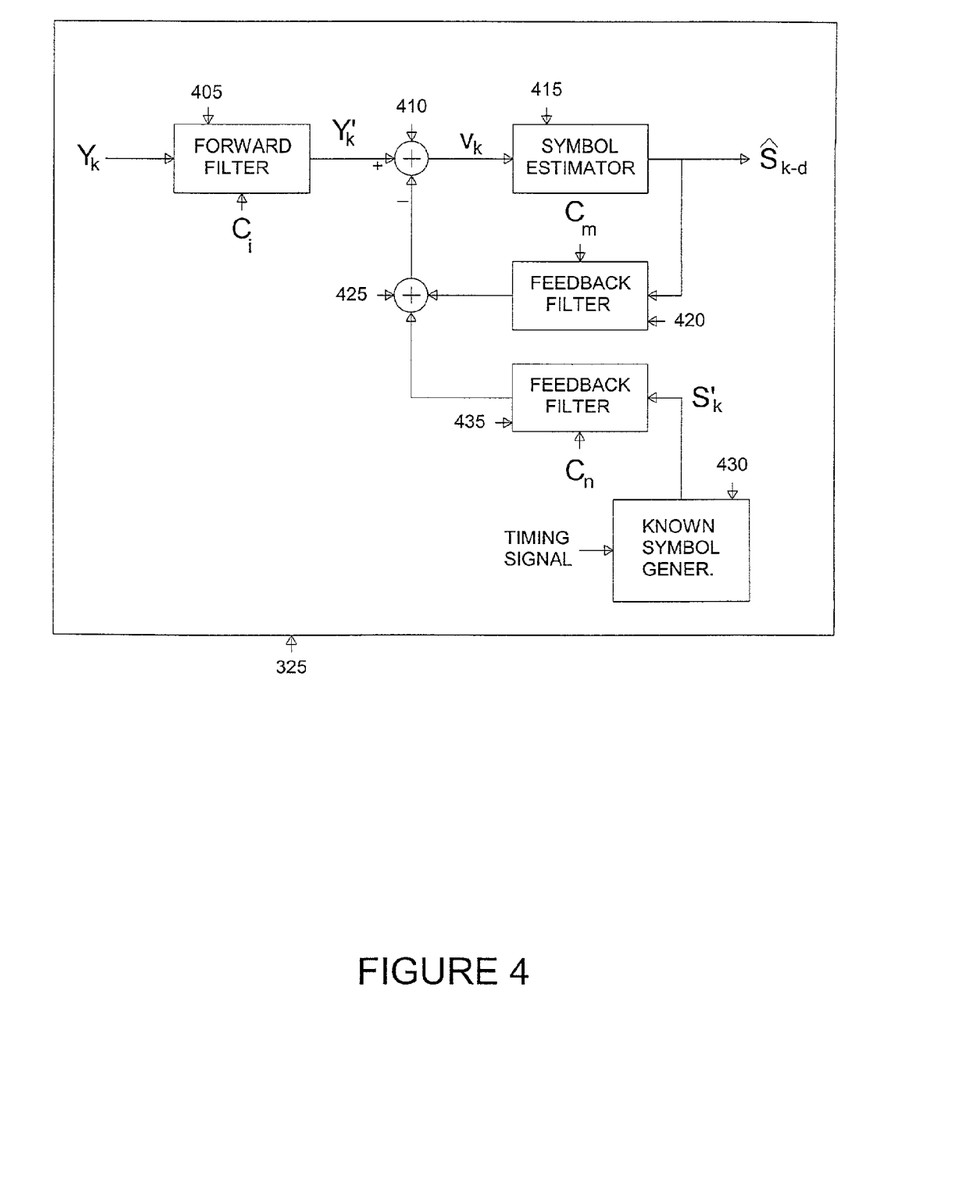
FIG. 4 illustrates an exemplary precursor cancellation decision feedback filter in greater detail according to one embodiment of the present invention.

FIG. 4 illustrates exemplary precursor cancellation decision feedback filter (PC-DFE) 325 in greater detail according to one embodiment of the present invention. PC-DFE 325 comprises forward filter 405, summer 410, symbol estimator 415, feedback filter 420, summer 425, feedback filter 435 and known symbol generator 430 according to one embodiment of the present invention. Those skilled in the art will recognize that forward filter 405, summer 410, symbol estimator 415, and feedback filter 420 constitute a conventional decision feedback filter capable of reducing postcursor ISI from previously estimated (or decided) symbols. The present invention differs from a conventional decision feedback filter due to the addition of summer 425, feedback filter 435, and known symbol generator 430.

As noted above, adaptive algorithm controller 335 determines the values of the weighting coefficients, $C_i$, of forward filter 405, the weighting coefficients, $C_m$, of feedback filter 420, and the weighting coefficients, $C_n$, of feedback filter 435. Adaptive algorithm controller 335 estimates the channel impulse response during receipt of the known training symbols and during receipt of other known symbols, such as known synchronization symbols and known packet identification symbols. If a training sequence is used, forward filter 405, feedback filter 420 and feedback filter 435 may be adaptively adjusted using the recursive least square (RLS) algorithm or the least mean square (LMS) algorithm.

Forward filter 405 receives the sequence of ISI-distorted symbols, $Y_k$, from sampler circuit 320 and produces an equalized output, $Y'_k$, that is an estimate of the input sequence. Adder 410 add the $Y'_k$ output to a composite (precursor and postcursor) ISI correction signal (explained below in greater detail) from summer 425 to produce the symbol estimate, $v_k$. Symbol estimator 415 quantizes the $v_k$ symbol estimate to the nearest symbol value to form a sequence of decided (i.e., detected) symbols, $\hat{s}_{k-d}$, that is transmitted to timing synchronization circuitry 330, adaptive algorithm controller 335, and receiver processing circuitry 340. The quantity k is the index of the current symbol and d is the decision (detection) delay associated with symbol estimator 415. The decided symbol sequence also is transmitted back to feedback filter 420, which removes that part of the intersymbol interference from the present estimate caused by previously detected symbols (i.e., post-cursor ISI).

Known symbol generator 430 receives a timing signal from timing synchronization circuitry 330 and transmits a sequence of known symbols, $S'_k$, through feedback filter 435 at the proper location in the sequence of known and unknown symbols that are being processed by symbol estimator 415. In an advantageous embodiment of the present invention, feedback filter 435 is a $L_2$-tap transversal filter chosen to minimize precursor ISI from the known symbols. The output of known symbol generator 430 is normally zero. However, known symbol generator 430 generates known symbols during the time periods when one or more preceding unknown symbols are being estimated by symbol estimator 415. In this manner, the effect of the precursor ISI of the known symbol can be removed from the present estimate, even though the known symbol has not been detected yet.

For example, if the sixth symbol in a sequence is known, known symbol generator 430 can output the sixth symbol during the estimation of the unknown fourth symbol and the unknown fifth symbol. The precursor ISI of the sixth symbol can therefore be removed from, for example, the fifth symbol estimate, just as feedback filter 420 removes from the fifth symbol estimate the postcursor ISI of the fourth symbol.

Figure 5:
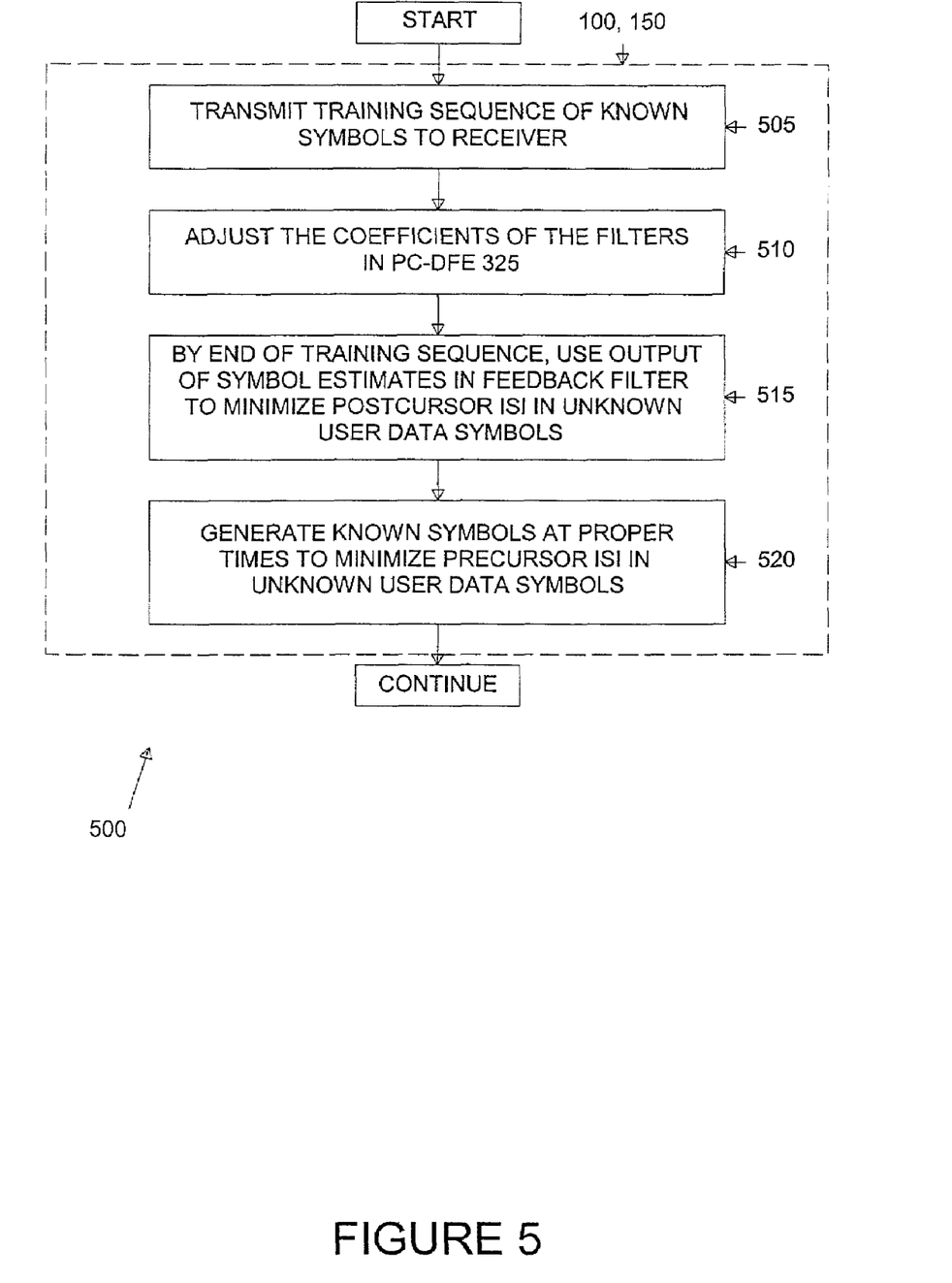
FIG. 5 is a flow diagram illustrating the operation of the transmitters and receivers in the exemplary wireline and wireless networks according to one embodiment of the present invention.

FIG. 5 depicts flow diagram 500, which illustrates the operation of exemplary transmitting stations 110 and 150 and exemplary receiving stations 121-123 and 171-173 in wireline network 100 and wireless network 150 according to one embodiment of the present invention. Transmission of user data begins when, for example, transmitting station 110 transmits a training sequence of known symbols to receiving station 121 (process step 505). Next, adaptive algorithm controller 335 in receiving station 121 adjusts the coefficients of the filters in PC-DFE 325 to achieve, for example, minimum mean square error (process step 510). At the end of the training sequence, PC-DFE 325 uses the output of symbol estimator 415 in feedback filter 420 to minimize postcursor ISI in subsequent unknown user data symbols (process step 515). At the same time, PC-DFE 325 uses the output of known symbol generator 430 in feedback filter 435 to minimize precursor ISI in subsequent unknown user data symbols (process step 520).

The operation of a receiver containing PC-DFE 325 may be further improved by known symbol distribution controller 215 in the transmitter. Known symbol distribution controller 215 improves receiver performance by optimizing the spacing (or distribution) of known symbols in the sequence of known and unknown symbols to take advantage of the precursor cancellation properties of PC-DFE 325. Since cancellation of pre-cursor ISI signals improves detection of the unknown symbols surrounding the known symbol, it follows that proper distribution of the known symbols may lead to an overall minimization of the symbol detection error rate.

Conventional techniques of distributing known symbols often carry a penalty in performance. For example, the distribution in a GSM data packet of 3 consecutive start symbols, 26 consecutive training symbols, and 3 consecutive stop symbols may not achieve the minimum symbol detection error rate even if PC-DFE 325 is used. Advantageously, the optimal symbol placement does not depend on the characteristics of the channel. Because known symbol placement is channel independent and controlled entirely by known symbol distribution controller 215 in the transmitting device, the present invention is particularly useful in broadcast applications.

Once it is assumed that the input data stream is composed of known and unknown symbols, the input data stream is no longer stationary. The performance of a precursor cancellation DFE for such a stream depends generally on the position of the symbol being detected and the conventional mean squared error (MSE) criterion is modified to take into account the performance at all the positions in the input data stream. Thus, the known symbol spacing (or distribution) performed by known symbol distribution controller 215 is determined by means of an average mean square error (AMSE) defined as:

$$M_a(P,f,B) = 1/N \Sigma_{k-d \notin P} [E(v_k - s_{k-d})^2]$$  Eqn. 1 where N is the total number of unknown symbols present in the transmitted signal, P is the index set for the known symbols, f is forward filter 405, and B is feedback filters 420 and 435. The value $v_k$ is the signal level at the input to symbol estimator 415 and the value $s_{k-d}$ is the signal level of the symbol that was actually transmitted. The value d is the decision delay of the decision (i.e., detection) delay of PC-DFE 235. The value of $v_k$, f, and B may be estimated from the known performance characteristics of a particular receiver rather then measured.

The symbol distribution selected by known symbol distribution controller 215 optimizes AMSE by determining the minimum value:

$$\min_{P,f,B} [M_a(P,f,B)]$$  Eqn. 2

Known symbol distribution controller 215 optimizes the known symbol placement for a given forward filter, f, if the receiver contains a precursor cancellation DFE similar to PC-DFE 235. The optimum distribution is determined by the decision delay, d. For a fixed decision delay, d, and a given forward filter, f, if the percentage of known symbols is less than $[100/(d+1)]\%$ of the sequence of known and unknown symbols, then a distribution set, P, is optimal if and only if $$|x_i - x_j| \geq d, \forall x_i, x_j \in P \text{ and } i \neq j$$  Eqn. 3 where $x_i$ and $x_j$ are the positions of two symbols in an exemplary distribution.

Conventionally, known symbols are placed in clusters as in the case of the 3 start symbols, 3 stop symbols and 26 training symbols in a GSM packet. Equation 3 above indicates that the performance of PC-DFE 235 in the receiving device can be improved if known symbol distribution controller 215 distributes individual known symbols across the incoming data stream with a minimum spacing equal to the decision (detection) delay, d. This type of spacing minimizes the symbol detection error rate across the entire input data stream.

Some systems require that known symbols be transmitted in clusters having a minimum size, such as clusters comprising three known symbols or four known symbols. Advantageously, Equation 3 above also indicates that the performance of PC-DFE 235 in the receiving device can be improved if known symbol distribution controller 215 distributes clusters of N known symbols across the incoming data stream with a minimum spacing between symbol clusters equal to the decision (detection) delay, d.

Figure 6:
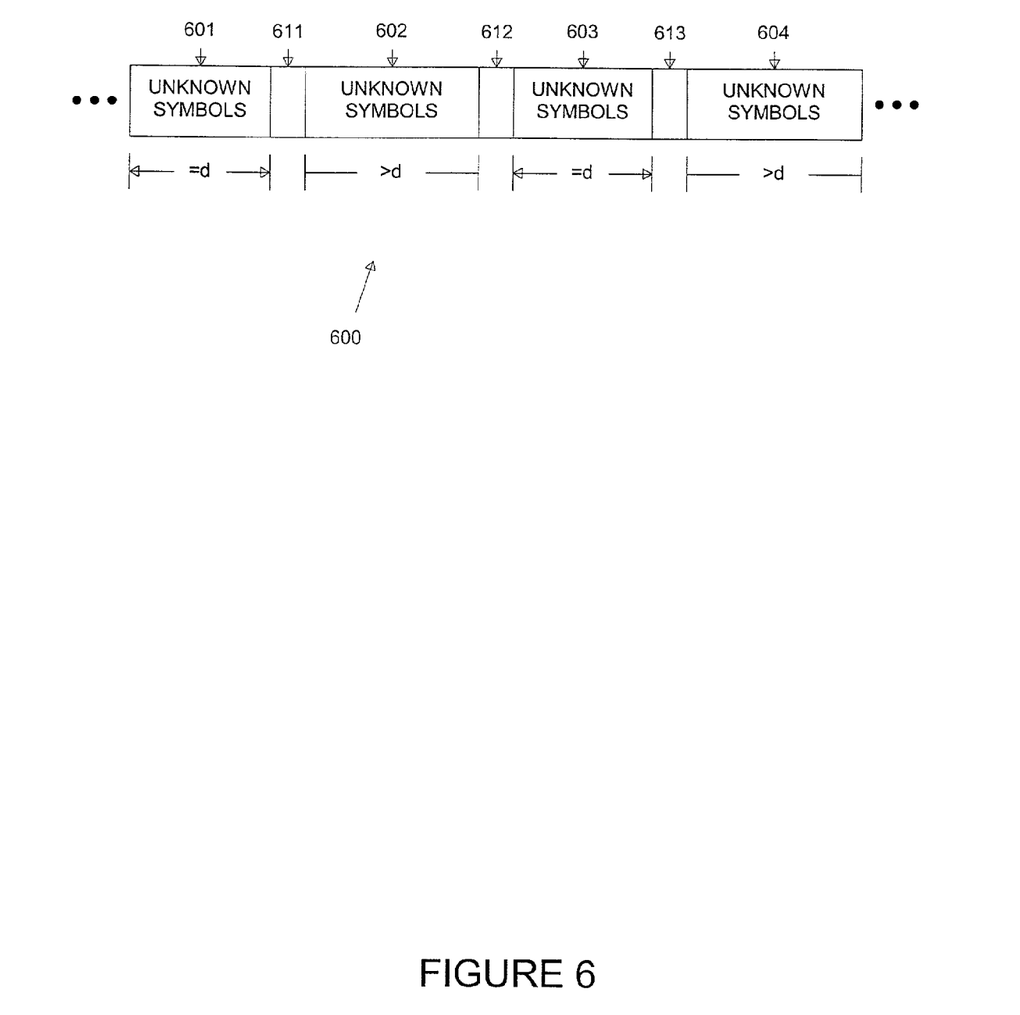
FIG. 6 illustrates an exemplary sequence of known and unknown symbols in which the known symbol distribution optimizes the performance of a receiver containing a precursor cancellation DFE according to one embodiment of the present invention.

FIG. 6 illustrates exemplary sequence 600 of known and unknown symbols in which the known symbol distribution optimizes the performance of a receiver containing a precursor cancellation DFE according to one embodiment of the present invention. The user data (i.e., unknown symbols) is contained in blocks 601, 602, 603 and 604. Known symbol distribution controller 215 has spaced known symbols 611, 612 and 613 apart by a minimum spacing greater than or equal to d. Thus, blocks 601 and 603 are equal in length to d, the minimum block size of unknown symbols. Blocks 602 and 604 are some length greater than d.

To properly distribute the known symbols in a transmitted stream of known and unknown symbols, known symbol distribution controller 215 must know the decision delay value, d, of each of the receiving stations 121-123 and 171-173 in the coverage area of the transmitting stations 110 and 160. The known symbol spacing is determined by known symbol distribution controller 215 according to the largest d of any of the receivers. In a one-way broadcast system, such as a high-definition television broadcast system, it may be difficult, if not impossible for known symbol distribution controller 215 to obtain the decision delay values of all of the HD televisions in the broadcast area. However, known symbol distribution controller 215 may select a known symbol distribution according to the largest value of d for any available HD television in the market. Transmitting station 160 may then transmit the selected known symbol distribution configuration in a known manner to HD televisions in the area. For example, the known symbol distribution configuration may be transmitted in a data block immediately following a training symbol sequence. The receivers in the HD televisions then may use the known symbol distribution configuration data to adjust known symbol generator 430 in order to detect subsequent transmitted symbols.

In two-way communication networks, however, it is easier for known symbol distribution controller 215 to obtain the decision delay values of all of receivers. For example, in a wireless or wireline LAN, a server may request the known decision delay values of all receivers in the network. The value of d may be embedded in all receivers by the manufacturers, for example. Similarly, in a cellular telephone network, a base station may request the known decision delay values of all mobile stations in the coverage area of the base station. In either case, the transmitting station can adjust the known symbol distribution and relate this information to the receiving stations. If a new receiving station is added to the network that has a longer decision delay that any existing receiving station, the transmitting station can recalculate and re-adjust the known symbol distribution and relate the updated known symbol distribution to the receiving stations.

Figure 7:
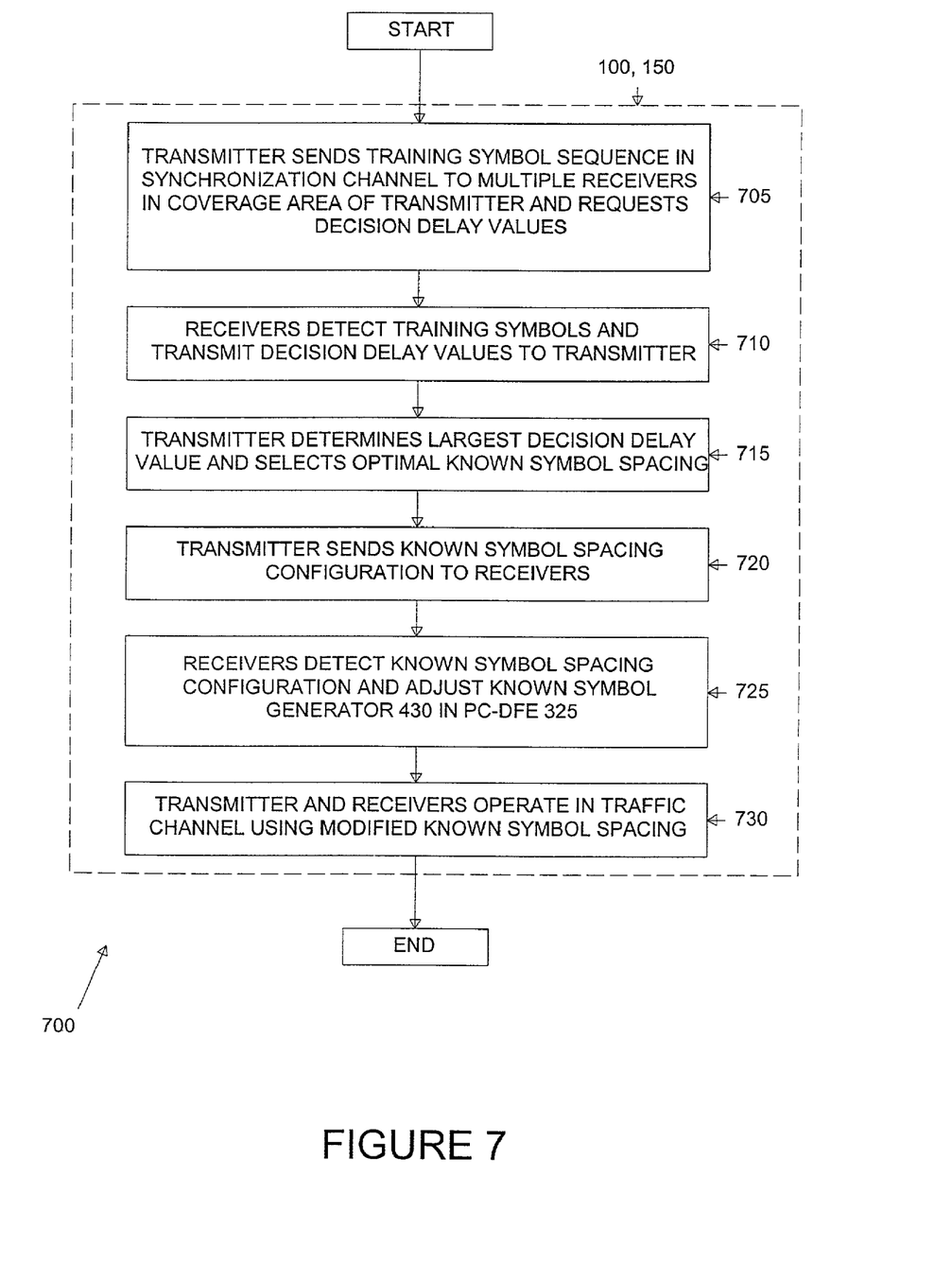
FIG. 7 is a flow diagram illustrating an adaptive known symbol distribution operation in the exemplary wireline and wireless networks according to one embodiment of the present invention.

FIG. 7 depicts flow diagram 700, which illustrates an adaptive known symbol distribution operation in exemplary wireline and wireless networks 100 and 150 according to one embodiment of the present invention. Initially, a transmitting station (transmitting station 160, for example) transmits a training symbol sequence in, for example, a synchronization channel to multiple receivers in its coverage area (or connected to it in a wireline LAN). A special purpose decision delay request message (or code) is also transmitted to the receivers (process step 705) The receiving stations (receiving stations 171-173, for example) detect the training symbols and the delay request message and, in response, transmit individual decision delay values to transmitting station 160 in, for example, an access channel (process step 710).

Next, transmitting station 160 determines the largest decision delay value and then determines and selects an optimal know symbol spacing (process step 715). Transmitting station 160 then transmits the selected known symbol spacing configuration data to receiving stations 171-173 (process step 720). Receiving stations 171-173 receive the selected known symbol spacing configuration data and adjust known symbol generator 430 in PC-DFE 325 accordingly (process step 725). Finally, transmitting station 160 and receiving stations 171-173 operate in, for example, a traffic channel using the selected known symbol spacing configuration data (process step 730).

Although the present invention has been described in detail, those skilled in the art should understand that they can make various changes, substitutions and alterations herein without departing from the spirit and scope of the invention in its broadest form.

What is claimed is:

1. A transmitter capable of transmitting a stream of known symbols and unknown symbols through a transmission channel to a first receiver that receives said transmitted stream of known symbols and unknown symbols distorted by intersymbol interference (ISI), wherein said first receiver comprises 1) a decision feedback equalizer for receiving said stream of distorted known symbols and distorted unknown symbols and generating a sequence of detected symbols and 2) a known symbol generator for generating a copy of a first known symbol prior to an estimation of said first known symbol by said decision feedback equalizer, said decision feedback equalizer using said copy of said first known symbol to reduce a precursor ISI signal in a second symbol, said second symbol being transmitted prior to said first known symbol, wherein the transmitter comprises a known symbol distribution controller capable of inserting a plurality of known symbols into an outgoing stream of unknown symbols in an optimum distribution.

2. The transmitter as set forth in claim 1 wherein said known symbol distribution controller is capable of determining a decision delay value associated with said decision feedback equalizer.

3. The transmitter as set forth in claim 2 wherein said known symbol distribution controller determines said optimum distribution according to the decision delay value.

4. The transmitter as set forth in claim 3 wherein said known symbol distribution controller separates each inserted known symbol from a nearest inserted known symbol by a distance at least equal to the decision delay value.

5. The transmitter as set forth in claim 1 wherein said transmitted stream of known symbols and unknown symbols is received by a plurality of receivers similar to said first receiver and wherein said known symbol distribution controller is capable of determining a plurality of decision delay values, wherein each decision delay value is associated with a corresponding decision feedback equalizer in one of said plurality of receivers.

6. The transmitter as set forth in claim 5 wherein said known symbol distribution controller is capable of determining a maximum decision delay value.

7. The transmitter as set forth in claim 6 wherein said known symbol distribution controller determines said optimum distribution according to said maximum decision delay value.

8. The transmitter as set forth in claim 7 wherein said known symbol distribution controller separates each inserted known symbol from a nearest inserted known symbol by a distance at least equal to said maximum decision delay value.

9. A network comprising:
 a plurality of receivers, each of said receivers capable of receiving from a transmission channel an incoming stream of known symbols and unknown symbols distorted by intersymbol interference (ISI), wherein each of said receivers contains an apparatus for reducing precursor ISI signals;
 a decision feedback equalizer capable of receiving said incoming stream of distorted known symbols and distorted unknown symbols and generating a sequence of detected symbols;
 a known symbol generator capable of generating a copy of a first known symbol prior to an estimation of said first known symbol by said decision feedback equalizer, wherein said decision feedback equalizer uses said copy of said first known symbol to reduce a first precursor ISI signal in a second symbol, said second symbol being transmitted prior to said first known symbol; and
 a transmitter capable of transmitting said stream of known symbols and unknown symbols, said transmitter comprising a known symbol distribution controller capable of inserting a plurality of known symbols into an outgoing stream of unknown symbols in an optimum distribution.

10. The network as set forth in claim 9 wherein said known symbol distribution controller is capable of determining a first decision delay value associated with a first decision feedback equalizer in said first receiver.

11. The network as set forth in claim 10 wherein said known symbol distribution controller determines said optimum distribution according to said first decision delay value.

12. The network as set forth in claim 11 wherein said known symbol distribution controller separates each inserted known symbol from a nearest inserted known symbol by a distance at least equal to said first decision delay value.

13. The network as set forth in claim 9 wherein said known symbol distribution controller is capable of determining a plurality of decision delay values, wherein each decision delay value is associated with a corresponding decision feedback equalizer.

14. The network as set forth in claim 13 wherein said known symbol distribution controller is capable of determining a maximum decision delay value.

15. The network as set forth in claim 14 wherein said known symbol distribution controller determines said optimum distribution according to said maximum decision delay value.

16. The network as set forth in claim 15 wherein said known symbol distribution controller separates each inserted known symbol from a nearest inserted known symbol by a distance at least equal to said maximum decision delay value.

17. A method of transmitting known symbols and unknown symbols comprising:
providing a transmitter and a plurality of receivers in a network, wherein each receiver receives from a transmission channel an incoming stream of known symbols and unknown symbols distorted by intersymbol interference (ISI), and wherein each receiver comprises: 1) a decision feedback equalizer that receives the incoming stream of distorted known symbols and distorted unknown symbols and generates a sequence of detected symbols; and 2) a known symbol generator that generates a copy of a first known symbol prior to an estimation of the first known symbol by the decision feedback equalizer, wherein the decision feedback equalizer uses the copy of the first known symbol to reduce a precursor ISI signal in a second symbol, said second symbol being transmitted prior to the first known symbol;
inserting a plurality of known symbols into an outgoing stream of unknown symbols in an optimum distribution; and transmitting the stream of known symbols and unknown symbols according to the optimum distribution.

18. The method as set forth in claim 17, further comprising determining a plurality of decision delay values, wherein each decision delay value is associated with a corresponding decision feedback equalizer; and
determining a maximum decision delay value.

19. The method as set forth in claim 18, further comprising determining the optimum distribution according to the maximum decision delay value.

20. The method as set forth in claim 19, further comprising separating each inserted known symbol from a nearest inserted known symbol by a distance at least equal to the maximum decision delay value.

* * * * *